United States Patent [19]
Hediger

[11] Patent Number: 5,036,339
[45] Date of Patent: Jul. 30, 1991

[54] LED ARRAY INTO FLOATING FOCUSING STRUCTURE FOR DIFFERENTIAL EXPANSION

[75] Inventor: Edwin A. Hediger, Fairport, N.Y.

[73] Assignee: Eastman Kodak Company, Rochester, N.Y.

[21] Appl. No.: 402,309

[22] Filed: Sep. 5, 1989

[51] Int. Cl.$^5$ .............................................. G01D 9/42

[52] U.S. Cl. ......................... 346/107 R; 346/139 R; 355/202

[58] Field of Search ................. 346/107 R, 108, 76 L, 346/160, 139 R; 355/202; 358/296

[56] References Cited

U.S. PATENT DOCUMENTS 4,059,345 11/1977 Kawamura et al. ............... 350/252
4,297,713 10/1981 Ichikawa et al. .................. 346/108
4,653,894 3/1987 Pease ....................................... 355/1
4,703,334 10/1987 Mochimaru et al. .............. 346/160
4,821,051 4/1989 Hediger .............................. 346/155

*Primary Examiner*—Mark J. Reinhart

[57] ABSTRACT

An optical printhead for use in electrophotographic copiers and printers. The printhead is constructed of a linear LED array and a linear fiber optic lens mounted above the LED array. The lens mounting structure provides a floating support for the lens at the two end regions of the lens. The floating mount provides for temperature-induced dimensional changes and prevents distortion and stress in the structure. The end mounted supports permit relative movement betweeen the end regions of the lens and the LED array in two dimensions, but restrict movement in the third dimension.

8 Claims, 3 Drawing Sheets

FIG. 2
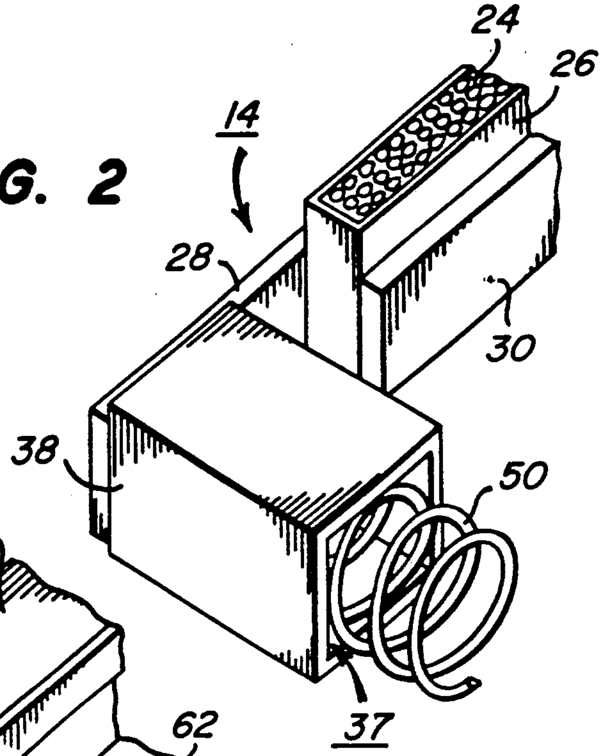
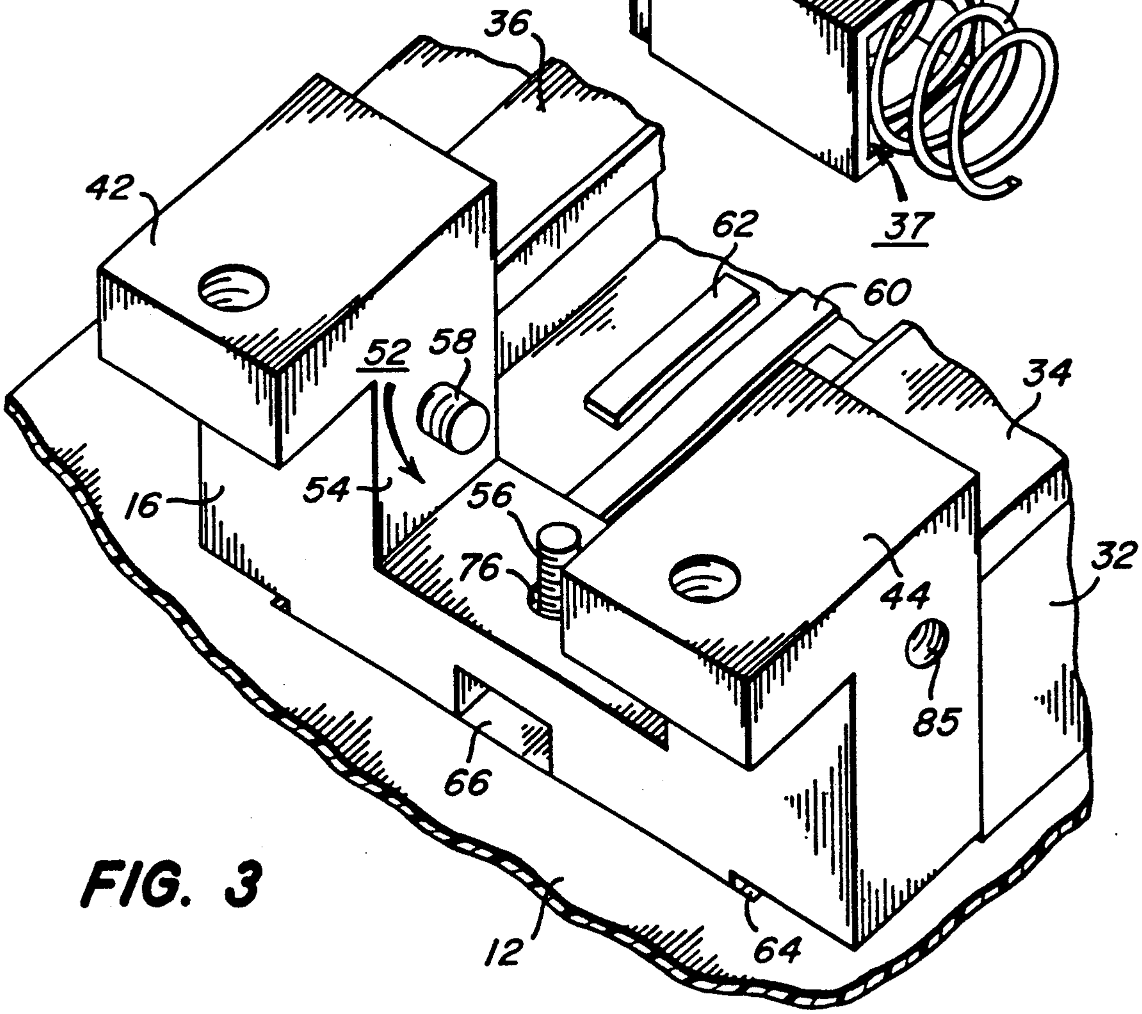
FIG. 3

LED ARRAY INTO FLOATING FOCUSING STRUCTURE FOR DIFFERENTIAL EXPANSION

BACKGROUND OF THE INVENTION

1. Field of the Invention

This invention relates, in general, to optical printheads and, more specifically, to LED printheads for use in copiers, printers, duplicators and like devices.

2. Description of the Prior Art

Optical printheads are used in copiers, duplicators and printers to expose a photosensitive surface or film in the apparatus in such a manner that a latent image is formed on the film. The image is later developed and transferred to paper for producing a hard copy output from the apparatus. Normally, optical printheads use light emitting diodes (LED's) to generate or produce the radiation necessary to expose the photosensitive film. In conventional printheads, the LED's are arranged in a linear array of LED's having a designed density to provide a resolution of a predetermined number of dots per inch. In addition, some printheads have lens assemblies supported over the LED array to provide a modular unit which can be prefocused and quickly changed between different machines. These lenses can be a plurality of fiber optic filaments bundled together to form a linear array having dimensions approximating the dimensions of the LED array. Because of the preciseness required in high resolution printheads of both the LED array and the lens assembly, special mounting precautions must be taken to insure stress and distortion-free performance of the printhead over a wide temperature range.

One requirement in such printheads is to maintain the lens assembly as straight as possible. U.S. Pat. No. 4,821,051, issued on Apr. 11, 1989 to the same assignee as the present invention, illustrates one method by which the lens assembly can be kept straight. According to that patent, a substantially large plate surrounds the lens and keeps the lens from becoming bowed or distorted. Mounting of the printhead to the associated copier or printer is accomplished by using the surfaces on the plate as the main mounting structure. The remaining portions of the printhead are connected to the plate for support, thus the plate surrounding the lens becomes the major or most substantial component in the assembly. While this provides for an appropriate printhead in some applications, the sheer size and weight of the overall printhead can present problems in some installations.

Another requirement in printheads is to provide some mechanical stress relief between the lens and LED portions of the printhead. Stress can occur with changes in the temperature of the printhead components. According to the referenced patent, the stress relief is provided by a special slotted backing plate to which the LED's are mounted. This arrangement also provides a printhead suitable for many applications, but the extra weight, cost and complexity of the slotted backing plate may be undesirable in certain installations.

Therefore, it is desirable, and an object of this invention, to provide a modular LED printhead which properly controls the shape of the lens and the mechanical stresses without the need for large, heavy and complex structures and components in the printhead.

SUMMARY OF THE INVENTION

There is disclosed herein a new and useful printhead assembly with a floating mounting system positioned at each end of the lens assembly of the printhead. Each of the two mounting systems includes a spring loaded block attached to an extended reinforcing plate which is a part of the lens assembly. The block is positioned within a U-shaped channel of an end-mounted support bracket and is held in position by a spring loaded bolt extending up from the bottom of the support bracket. This bolt extends through an oversized opening or hole in the bracket and, therefore, allows for limited movement of the block with respect to the bracket. An adjustment screw extends through a portion of the bracket to locate the lens assembly directly over the LED array.

With the floating attachment provided by this invention, any difference in thermal expansion of the various members of the printhead can be compensated for, and the mechanical stresses induced thereby are substantially relieved. This allows for extended printhead life and tolerance accuracy. The floating attachment allows the lens assembly of the printhead to move in the two dimensions which are substantially at the same distance from the LED array. The third dimension, which extends away from the LED array, is substantially fixed by the floating attachment of this invention after the initial alignment of the lens has been completed.

BRIEF DESCRIPTION OF THE DRAWINGS

Further advantages and uses of this invention will become more apparent when considered in view of the following detailed description and drawings, in which:

FIG. 2 is a partial view of the lens assembly for the printhead shown in FIG. 1;

FIG. 3 is a partial view of a supporting bracket for the printhead shown in FIG. 1;

DESCRIPTION OF THE PREFERRED EMBODIMENTS

Figure 1:
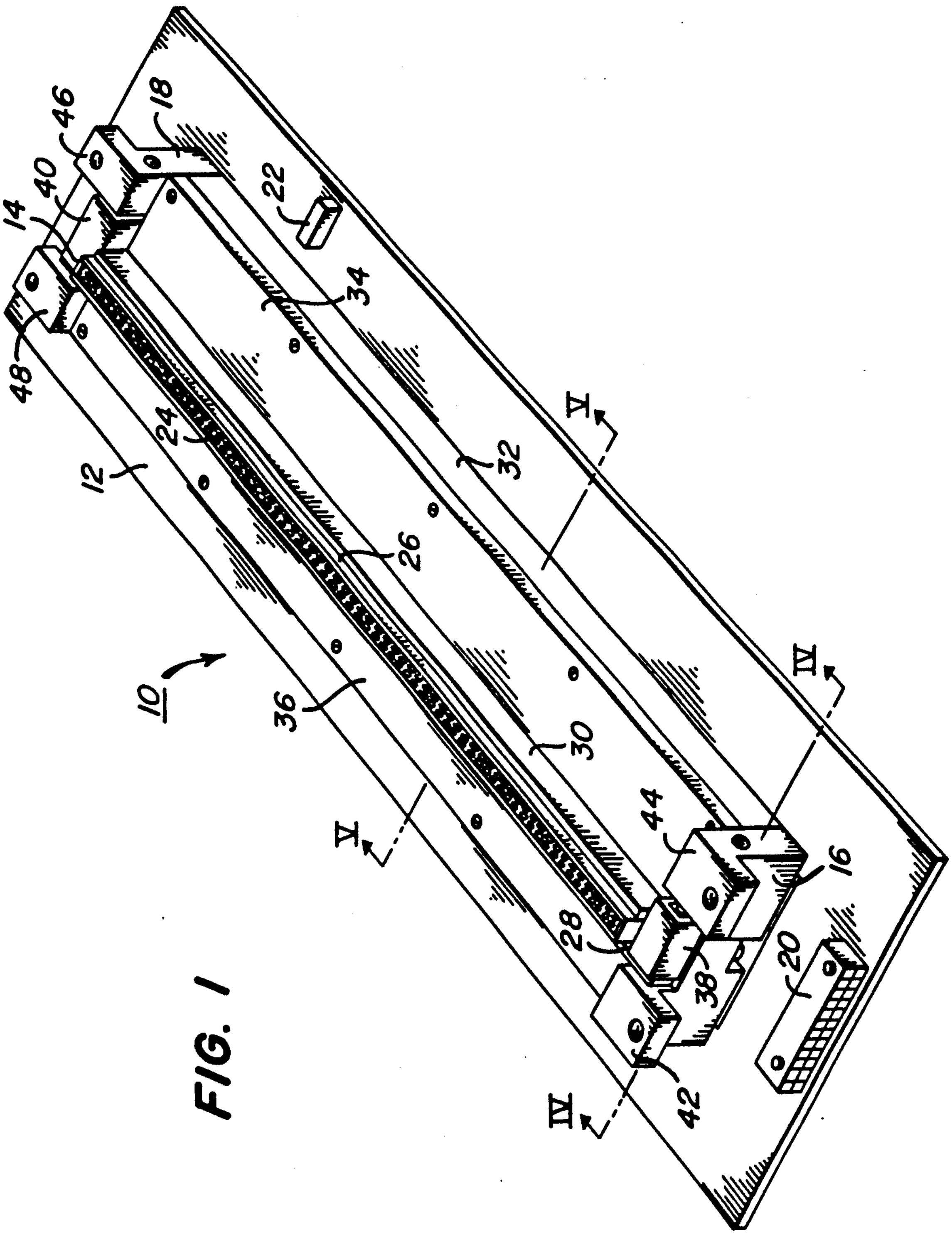
FIG. 1 is a view of a complete printhead constructed according to this invention.

Throughout the following description, similar reference characters refer to similar elements or members in all of the figures of the drawings.

Referring now to the drawings, and to FIG. 1 in particular, there is shown a printhead 10 constructed according to this invention. The printhead 10 includes the circuit board 12, the lens assembly 14, and the end-mounted support brackets 16 and 18. The circuit board 10 contains some of the support electronics necessary to interface with the LED elements of the printhead, which are now shown in FIG. 1. The circuit board 10 also provides a means for conveniently connecting to and adjusting the electrical circuit associated with the LED array. Connector 20 and the adjustable resistor 22 are illustrated in FIG. 1 as examples of components which may be used for this purpose.

The lens assembly 14 includes a plurality of glass filaments or optical fibers 24 which are housed or encased in a linear or elongated housing 26. The lens assembly 14 can be a commercially available product manufactured by Nippon Sheet Glass Company, Ltd. under the trademark name of SELFOC. Reinforcing plates 28 and 30 are a part of the lens assembly 14 and are rigidly attached to the housing 26 by a suitable process or adhesive. The purpose of plates 28 and 30 is to increase the rigidity of the lens structure and maintain the straightness of the lens structure over a wide temperature range. The reinforcing plate 28 is also used as an attachment point for mounting the lens assembly to the supporting brackets 16 and 18. The lens assembly is positioned over a linear array of LED elements positioned directly below the lens assembly 14 and enclosed by cover members 32, 34 and 36. These members can be constructed of a lightweight material such as plastic since they do not furnish any significant support to the lens assembly 14.

The reinforcing plate 28 of the lens assembly 14 is attached to mounting or support blocks 38 and 40 at each end. These blocks are respectively positioned in U-shaped channels or openings of the support brackets 16 an 18. As will be shown in more detail in other figures of the drawings, these blocks are secured to the brackets in such a fashion that there is a floating connection between the two members so that differential expansion between the members of the printhead can be compensated for without distorting the major components of the printhead. The brackets 16 and 18 and the blocks 38 and 40 form the basic supporting structure for the focusing structure, or lens system 14.

In addition to supporting the lens assembly 14, the brackets 16 and 18 include the mounting and alignment surfaces 42, 44, 46 and 48 which are used to connect the printhead to the associated apparatus, such as the copier or printer in which the printhead is used. It can be seen from FIG. 1 that these mounting surfaces project from the support brackets and, as a consequence, all of the mechanical support for the printhead 10 is provided by the mounting brackets, rather than any structure which is rigidly attached to or positioned around the lens assembly 14, as used in some prior art printheads. Further detail of the support brackets and the end-mounted supporting blocks shown in FIG. 1 will be evident from a study of the other figures of the drawings.

FIG. 2 is a partial view of the lens assembly 14 shown in FIG. 1. The reinforcing plate 28 extends beyond both ends of the longitudinal lens housing 26, with only one end being shown in FIG. 2. Both plates 28 and 30 can be constructed of a rigid material, such as steel, and can be attached to the housing 26 by a suitable process, such as by an adhesive. Plates on both sides of the housing 26 provide a symmetrical structure around the housing and prevent bending which may be caused if only one plate was used.

The block 38 is attached to the end of the plate 28 as shown in FIG. 2. A similar block is attached to the other end of the plate 28 but is not shown in FIG. 2. The block 38 may be constructed of a steel material to provide the rigidity and strength needed to accurately maintain the position of the lens assembly 14 over the LED array. Part of the floating attachment of the block to the respective support bracket is provided by spring loading the block within the channel of the associated support bracket. This spring loading is provided by the spring 50 which extends within the hollow opening 37 of the block 38. More detail of the spring loaded connection between the block 38 and the associated bracket is shown in FIG. 4.

FIG. 3 is a partial view of a supporting bracket into which the lens assembly block 38 of FIG. 2 would be inserted for connection. According to FIG. 3, the bracket 16 contains the U-shaped opening 52 which is defined on one side thereof by the surface 54. The block 38, shown in FIG. 2, is inserted into this opening and is secured thereto by the spring loaded screw 56. The adjustment screw 58 is used to adjust the force for the spring loading applied to the block 38 by spring 50, also shown in FIG. 2. In other words, turning the adjustment screw 58 in the appropriate direction will either compress or expand the spring 50 to properly align the lens assembly 14 over the LED array. In FIG. 3, the LED array 60 can be seen along with some of the support or driver IC's, such as IC 62.

The bracket 16 extends through an opening 64 in the circuit board 12 and is attached directly to the structure 66 which is used to support the LED array 60. The structure 66 can be a heavy metal plate or heat sink which is used to provide a mounting surface for the brackets, and to provide a supporting surface for the LED array. In any event, the supporting structure for the lens assembly shown in FIG. 2 is positioned at the two end regions of the lens assembly and the bracket to which the lens assembly is attached is connected or attached to the two end regions of the LED array.

Figure 4:
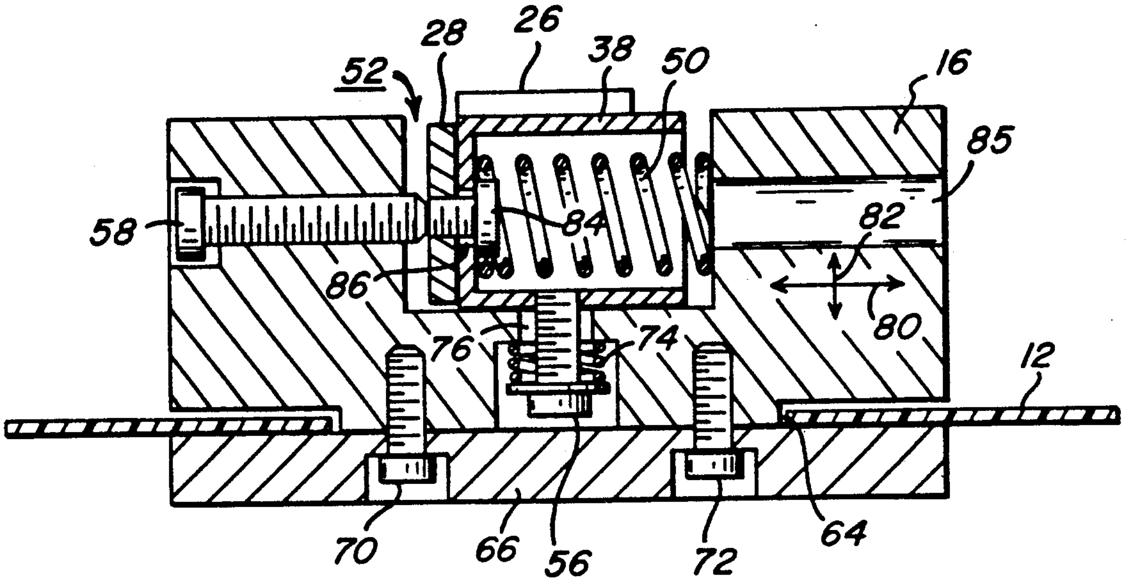
FIG. 4 is a cross-sectional view of a support bracket taken generally along the line IV—IV of FIG. 1.

FIG. 4 is a cross-sectional view of the support bracket 16 shown in FIG. 1 taken generally along the line IV—IV. The support bracket 16 is rigidly attached through the opening 64 of the circuit board 12 to the structure 66 by the attachment bolts or screws 70 and 72. The block 38 is held in the U-shaped opening 52 by the screw 56 which is spring loaded by the spring 74 as shown in FIG. 4. The screw 56 extends through an oversized opening 76 in the bracket 16 so that some movement can occur between the block 38 and the bracket 16. The resistance to movement is determined by the amount of loading provided by the spring 74 and also, to some extent, by the spring 50. Thus, the block 38 is free to move along an axis or dimension in the direction shown by arrows 80, either by a change in the loading of the spring 50 or by adjustment of the screw 58. Limited movement along the other dimension or direction, which would be perpendicular to the plane of FIG. 4, is permitted by the oversized nature of the opening 76. However, the dimension or direction indicated by the arrows 82, which extends directly away from the LED array, is fixed and held constant by the spring loading on the bolt 56. In other words, the floating attachment of the block 38 to the bracket 16 allows relative movement in two dimensions and prohibits relative movement in the third dimension. The two dimensions along which relative movement is allowed extend substantially at the same distance from the light emitting array. The dimension along which the relative movement is restricted extends directly away from the light emitting array.

The block 38 is rigidly attached to the plate 28 by the bolt or screw 84. Access to the sensor 84 is provided by the opening 85. The oversized opening 86 in the base of the block 38 allows vertical adjustment of the lens assembly by permitting alignment of the block 38 when it is being attached to the plate 28. Thus, adjustment in the dimension indicated by arrows 82 is permitted during assembly of the printhead within the tolerance of the opening 86.

Figure 5:
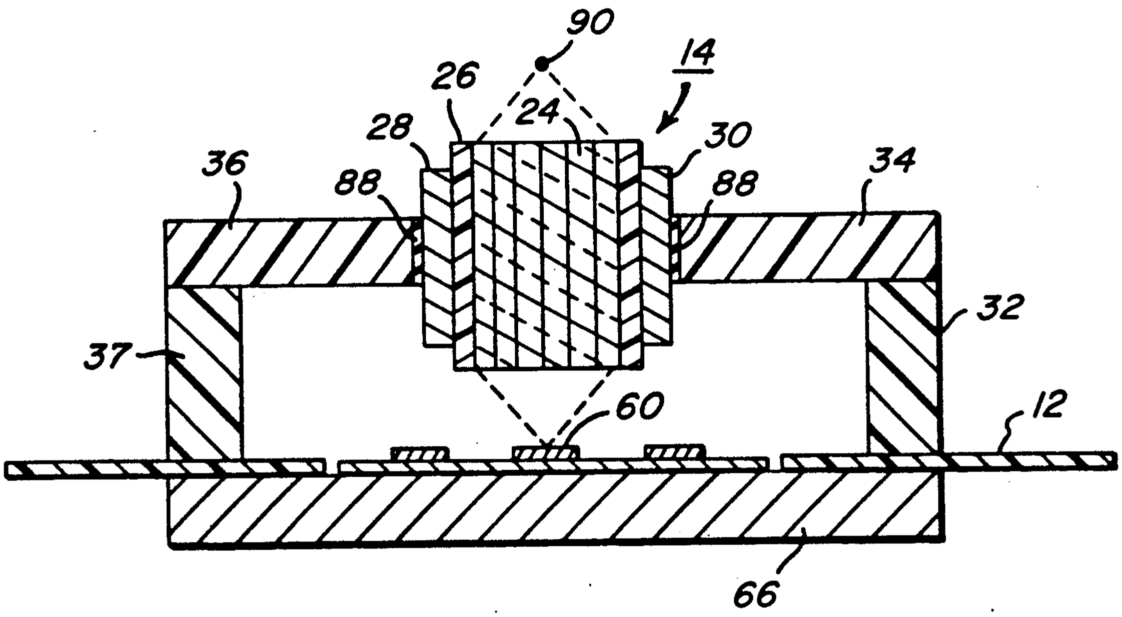
FIG. 5 is a cross-sectional view of the printhead shown in FIG. 1 taken generally along the line V—V.

FIG. 5 is a cross-sectional view of the printhead shown in FIG. 1 taken generally along the line V—V. This figure illustrates the relationship of the lens assembly 14 to the LED array 60 at all the positions between the two end support structures of the printhead. As shown in FIG. 5, the entire assembly is supported from the structure 66. Since the plastic cover members 32, 34, 36 and 37 are not required to give any support to the lens assembly 14, their attachment to each other and to the structure 66 can be by various means, which are not shown in FIG. 5, such as small screws or an adhesive. A foam or resilient material 88 is positioned between the cover members 34 and 36 and the lens assembly 14 to provide a dust free enclosure around the LED array 60 and to allow some movement of the lens assembly with respect to the cover members. Of course, the main purpose of the lens assembly 14 is to focus light at point 90 which originates from the LED array 60. Therefore, the mounting structure, as shown in FIG. 4, must provide means for adjusting and focusing the lens assembly 14 with respect to the LED array 60. The structure shown in FIG. 4 provides the adjusting means along with a supporting structure which holds the lens assembly in adjustment while still providing a floating mounting system which will relieve mechanical stresses created by differential expansion of the members due to varying temperature conditions.

It is emphasized that numerous changes may be made in the above-described apparatus without departing from the teachings of the invention. It is intended that all of the matter contained in the foregoing description, or shown in the accompanying drawings, shall be interpreted as illustrative rather than limiting.

I claim as my invention:

1. A printhead assembly for selectively exposing a photosensitive surface to provide a latent image, said printhead comprising:

an elongated linear array of light emitting elements, said array having first and second end regions;

means for supporting said linear array;

an elongated light beam focusing structure positioned above and parallel to said array, said focusing structure having first and second end regions;

a first support for attaching the first end region of the focusing structure to the array supporting means; and a second support for attaching the second end region of the focusing structure to the array supporting means;

said first and second supports each being movable in a direction across the elongated direction of the focusing structure to align said focusing structure and said array, and providing, after alignment, a floating attachment of the focusing structure with respect to the array, with the floating providing for differential expansion by allowing some relative movement between the focusing structure and the light emitting array at least in a direction parallel to the elongation of the focusing structure.

2. The printhead assembly of claim 1 wherein the light beam focusing structure includes an array of optical fibers enclosed in a longitudinal housing, a first reinforcing plate attached to one side of the housing, and a second reinforcing plate attached to the opposite side of the housing.

3. The printhead assembly of claim 2 wherein the first reinforcing plate extends beyond both ends of the optical fiber housing to provide the first and second end regions of the focusing structure.

4. The printhead assembly of claim 1 wherein the first and second supports each include:

a bracket rigidly fastened to the array supporting means;

block means rigidly connected to the focusing structure; and means for securing the block means to the bracket;

said securing means prohibiting relative movement between the block means and the bracket along a dimension extending directly away from the element array and allowing limited relative movement between the block means and the bracket in the other two dimensions.

5. The printhead assembly of claim 4 wherein the block means includes means for spring loading the block means against the bracket.

6. The printhead assembly of claim 5 wherein the bracket includes an adjustment screw oriented to provide adjustment of the focusing structure and to change the amount of spring loading between the block means and the bracket.

7. The printhead assembly of claim 4 wherein the securing means includes a spring loaded screw extending through an oversize hole in the bracket and fastened rigidly to the block means.

8. The printhead assembly of claim 4 wherein the brackets include means for mounting the printhead assembly in the associated apparatus.

* * * * *